(12) United States Patent
Copeland et al.

(10) Patent No.: US 11,846,326 B1
(45) Date of Patent: Dec. 19, 2023

(54) ACTUATING ASSEMBLY FOR AN ACTUATABLE DEVICE IN A MOTOR VEHICLE DRIVETRAIN

(71) Applicant: Schaeffler Technologies AG & Co. KG, Herzogenaurach (DE)

(72) Inventors: James Copeland, Massillon, OH (US); Kenneth Hunt, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/960,320

(22) Filed: Oct. 5, 2022

(51) Int. Cl.
*F16D 11/14* (2006.01)

(52) U.S. Cl.
CPC ...... *F16D 11/14* (2013.01); *F16D 2250/0084* (2013.01)

(58) Field of Classification Search
CPC .................................. F16D 11/10; F16D 11/14
See application file for complete search history.

(56) References Cited

U.S. PATENT DOCUMENTS

| | | |
|---|---|---|
| 3,205,863 A | 9/1965 | Nolan |
| 3,288,115 A | 11/1966 | Hechtle |
| 4,192,411 A * | 3/1980 | Fogelberg ............... F16D 41/00 192/36 |
| 2008/0296964 A1* | 12/2008 | Williams ................ F16D 11/14 301/105.1 |
| 2015/0316110 A1* | 11/2015 | Oram ..................... F16D 27/112 74/405 |
| 2017/0298996 A1* | 10/2017 | Mayr .................. B60K 17/3462 |
| 2017/0356504 A1* | 12/2017 | Heravi .................. F16D 48/064 |
| 2018/0216671 A1* | 8/2018 | Reichert ................. F16D 23/12 |
| 2019/0203779 A1* | 7/2019 | Baehr ..................... F16H 63/30 |
| 2021/0148415 A1* | 5/2021 | Bolle ...................... F16D 11/10 |

* cited by examiner

*Primary Examiner* — Stacey A Fluhart
(74) *Attorney, Agent, or Firm* — Davidson, Davidson & Kappel, LLC

(57) ABSTRACT

An actuating assembly includes a body; a plunger axially movable with respect to the body; a linear actuator configured for being activated to axially move the plunger in a first direction into engagement with the body such that the plunger and body are rotationally fixed with respect to each other; a barrel movable with respect to the body for contacting the plunger and the body depending on an axial position of the plunger; and a spring for biasing the barrel toward the plunger. The barrel is configured such that the spring forces the barrel into circumferential engagement with the body in two different axial positions of the barrel with respect to the body when the linear actuator is inactive depending on a rotational orientation of the barrel.

19 Claims, 2 Drawing Sheets

ACTUATING ASSEMBLY FOR AN ACTUATABLE DEVICE IN A MOTOR VEHICLE DRIVETRAIN

The present disclosure relates generally to motor vehicle drivetrains and more specifically to actuating assemblies for actuatable devices in motor vehicle drivetrains.

BACKGROUND

Disconnect clutches and valves are actuatable devices used in automotive drivetrains that can be actuated by an actuating assembly.

SUMMARY OF THE INVENTION

An actuating assembly for an automotive drivetrain is provided. The actuating assembly includes a body; a plunger axially movable with respect to the body; a linear actuator configured for being activated to axially move the plunger in a first direction into engagement with the body such that the plunger and body are rotationally fixed with respect to each other; a barrel movable with respect to the body for contacting the plunger and the body depending on an axial position of the plunger; and a spring for biasing the barrel toward the plunger, the barrel being configured such that the spring forces the barrel into circumferential engagement with the body in two different axial positions of the barrel with respect to the body when the linear actuator is inactive depending on a rotational orientation of the barrel.

In some examples, the actuating assembly is configured such that, depending on the axial position of the plunger and a rotational orientation of the barrel, the spring forces the barrel into each of: a first orientation in which the barrel circumferentially engages the plunger; a second orientation in which a first surface of the barrel circumferentially engages the body and the barrel is in a first axial position of the two different axial positions; and a third orientation in which a second surface of the barrel circumferentially engages the body and the barrel is in a second axial position of the two different axial positions.

In some examples, the barrel is axially closer to the engagement surface of the plunger in the second orientation than in the third orientation.

In some examples, the barrel includes barrel ramps and the plunger includes plunger ramps, the barrel ramps axially contacting the plunger ramps in the first orientation.

In some examples, the body includes tabs having tab ramp surfaces, the tab ramp surfaces axially contacting the barrel ramps in the third orientation.

In some examples, the barrel includes barrel slots, the tabs being received in the barrel slots in the second orientation.

In some examples, the barrel slots are formed in some of the barrel ramps.

In some examples, the plunger includes plunger slots receiving the tabs to rotationally fix the plunger and the body with respect to each other.

In some examples, the linear actuator is configured for actuating the plunger solely in the first direction.

In some examples, the barrel is a different circumferential position with respect to the body in each of the two different axial positions.

In some examples, the two different axial positions are directly rotationally adjacent each other.

In some examples, the plunger includes a first plunger surface configured for circumferentially engaging a first body surface of the body to rotationally connect the plunger with the body.

In some examples, the first plunger surface is on at least one slot on of the plunger and the first body surface is on at least one tab of the body, the at least one tab of the body entering into the at least one slot of the plunger to rotationally connect the plunger with the body.

In some examples, the plunger includes a second plunger surface configured for circumferentially engaging a first barrel surface of the barrel when the solenoid is activated.

In some examples, the second plunger surface is on at least one stop edge of a plunger ramp of the plunger and the first barrel surface is on at least one stop edge of a barrel ramp of the barrel.

In some examples, the barrel includes a second barrel surface configured for circumferentially engaging a second body surface to rotationally connect the barrel with the body in a first of the two different axial positions of the barrel.

In some examples, the second barrel surface is on at least one slot of the barrel and the second body surface is on axial end of at least one tab of the body, the at least one tab of the body entering into the at least one slot of the barrel to rotationally connect the barrel with the body.

In some examples, the first barrel surface is configured for circumferentially engaging the first body surface to rotationally connect the barrel with the body in a second of the two different axial positions of the barrel.

A method of constructing an actuating assembly for an automotive drivetrain is also provided including rotationally fixing a plunger to a body such that the plunger is axially movable by a linear actuator with respect to the body in a first direction when the linear actuator is activated; resiliently preloading a barrel for axial movement with respect to the body and the plunger such that depending on an axial position of the plunger and a rotational orientation of the barrel, the barrel is forceable into each of: a first orientation in which the barrel circumferentially engages an engagement surface of the plunger; a second orientation in which a first surface of the barrel circumferentially engages the body and the barrel is in a first axial position; and a third orientation in which a second surface of the barrel circumferentially engages the body and the barrel is in a second axial position axially closer to the engagement surface of the plunger in the second orientation than in the third orientation.

BRIEF DESCRIPTION OF THE DRAWINGS

The present disclosure is described below by reference to the following drawings, in which.

DETAILED DESCRIPTION

The present disclosure provides a bi-stable actuating assembly that enables a single-acting linear actuator—i.e., one that actuates in only a single direction (push-only or pull-only)—to actuate a plunger into either of two stable positions, then hold the plunger in the respective stable position without the need for continued application of the linear actuator force. In an example where the actuator is an electrical solenoid, the plunger is held in respective stable position without the need for continued application of the electrical energization of the solenoid.

In general, in a solenoid-actuated device offering two different positions, one of those positions would require the solenoid to be continuously energized. If continuous energization in one position is not acceptable, then a bi-stable mechanism, de-energized in each of its two stable positions (after the initial, momentary energization required to move the device to that position), two solenoids can used in combination with mechanical detents in the mechanism.

This present disclosure enables a single, single-acting solenoid to switch a device between two stable positions, and then remain de-energized in either of those two positions.

Figure 1:
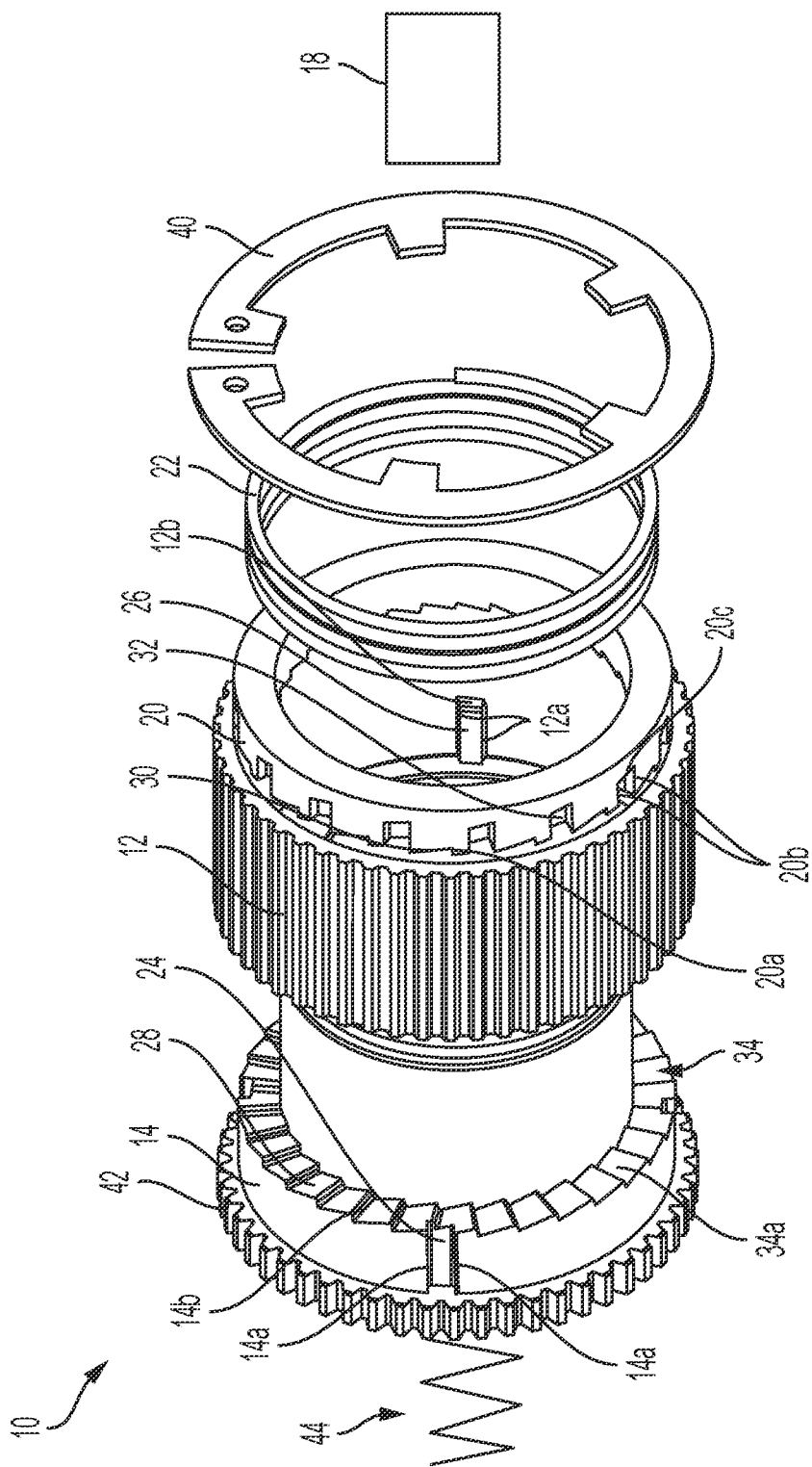
FIGS. 1 and 2 illustrate different exploded views of an example of an actuating assembly of the present disclosure.
Figure 2:
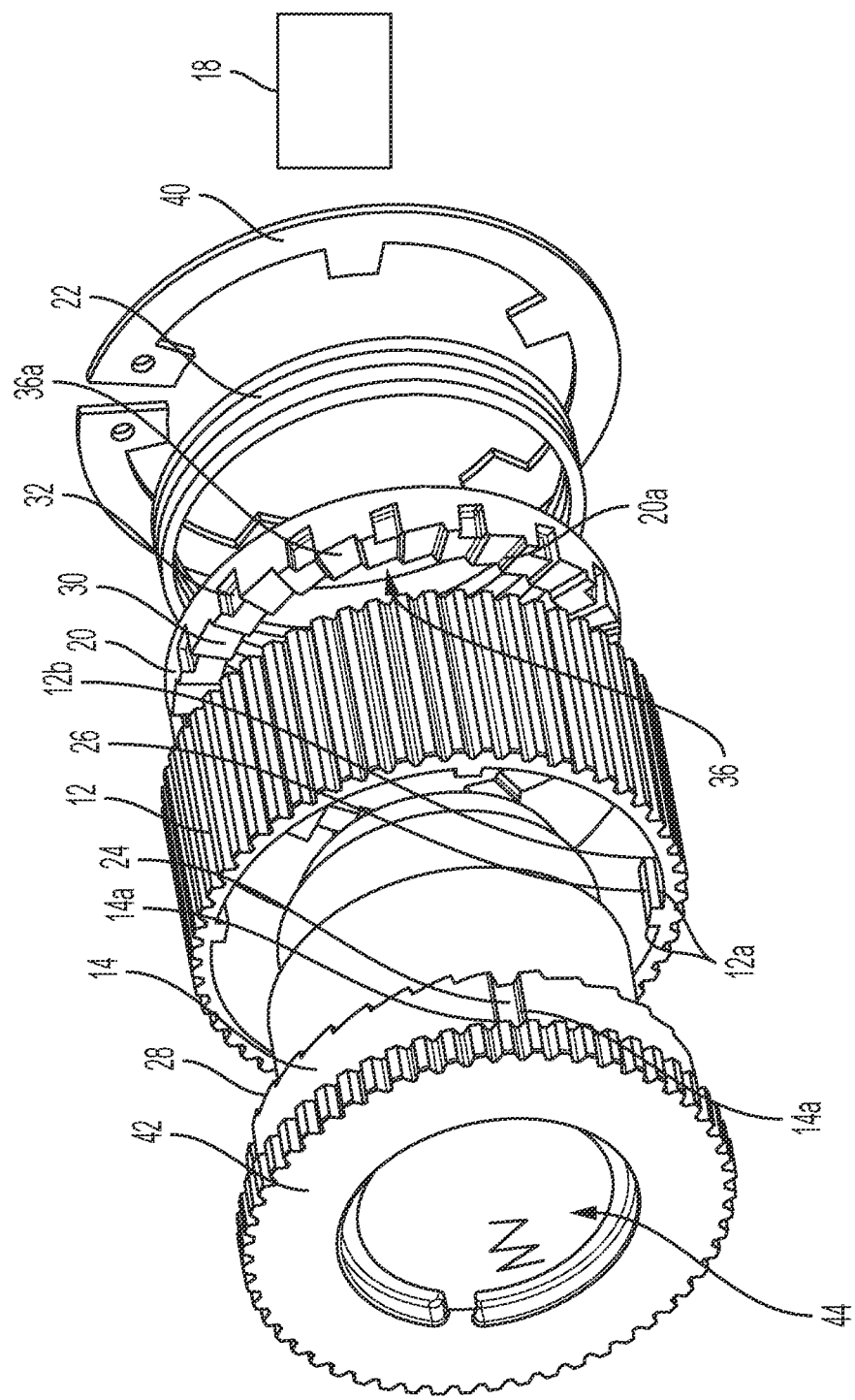

FIGS. 1 and 2 illustrate different exploded views of an actuating assembly 10 for an actuatable device in an automotive drivetrain. The actuatable device can be a clutch or a hydraulic valve. Actuating assembly 10 can include a body 12, a plunger 14 axially movable with respect to the body 12, a linear actuator 18 configured for being activated to axially move the plunger 14 in a first direction into engagement with the body 12 and a barrel 20 movable with respect to the body 12 for contacting the plunger 14. The linear actuator 18, which is shown schematically, is configured for actuating the plunger 14 solely in the first direction. For example, linear actuator 18 can be a solenoid. Actuating assembly 10 can also include a spring 22 for biasing the barrel 20 toward the plunger 14. The barrel 20 is configured such that the spring 22 forces the barrel 20 into circumferential engagement with the body 12 in two different axial positions of the barrel 20 with respect to the body 12 when the linear actuator 18 is inactive. As explained further below, the barrel 20 is in a different circumferential position with respect to the body 12 in each of the two different axial positions, and the two different axial positions are directly rotationally adjacent to each other.

The plunger 14 includes a first plunger surface 14a configured for circumferentially engaging a first body surface 12a of the body 12 to rotationally connect the plunger 14 with the body 12. In the example shown in FIG. 1, the first plunger surface 14a is formed on circumferentially facing edges of at least one slot 24 on of the plunger 14 and the first body surface 12a is formed on circumferentially facing edges of at least one tab 26 of the body 12. The at least one tab 26 enters into the at least one slot 24 to rotationally connect the plunger 14 with the body 12. More specifically, FIG. 1 shows that plunger 14 includes a plurality of circumferentially spaced apart slots 24 and body 12 includes a plurality of circumferentially spaced apart tabs 26, with each of tabs 26 entering into one of slots 24.

Plunger 14 also includes a second plunger surface 14b configured for circumferentially engaging a first barrel surface 20a of the barrel 20 when the linear actuator 18 is activated. The second plunger surface 14b is on at least one stop edge of a plunger ramp 28 and the first barrel surface 20a is on at least one axially extending stop edge of a barrel ramp 30.

The barrel 20 also includes second barrel surfaces 20b, 20c configured for circumferentially engaging first body surface 12a and a second body surface 12b to rotationally connect the barrel 20 with the body 12 in a first axial position of the two different axial positions of the barrel 20. The second barrel surfaces 20b, 20c are on at least one slot 32 of the barrel and the second body surface 12b on an axial end of at least one tab 26. Surfaces 20b are on circumferentially facing and axially extending portions of slots 32 and surfaces 20c are ramped surfaces extending between two surfaces 20b. Surfaces 20c, 12b are ramp surfaces tapered such that surfaces 20c, 12b extend circumferentially to a greater extent than surfaces 20c, 12b, respectively, extend axially. The at least one tab 26 enters into the at least one slot 32 of the barrel 20 to rotationally connect the barrel 20 with the body 12. The first barrel surface 20a is also configured for circumferentially engaging the second body surface 12b to rotationally connect the barrel 20 with the body 12 in a second axial position of the two different axial positions of the barrel 20.

More specifically, barrel 20 includes a plurality of ramps 30 that are directly circumferentially adjacent to each other. Some of ramps 30—every other ramp 30 in the example shown in FIG. 1, are each intersected by one of slots 32. Each ramp 30 has a shape that is complementary to each of ramps 28 of plunger 14 to allow for the engagement surface 34 of plunger 14, which is formed by a plurality of axially and circumferentially extending ramp surfaces 34a, to axially rest flush against plunger engaging surface 36 of barrel 20, which is formed by a plurality of axially and circumferentially extending ramp surfaces 36a.

Actuating assembly 10 can further include a retainer 40 for holding spring 22 axially in place, and an armature 42 formed as a single piece with plunger 14, allowing the linear actuator 18 in the form of the solenoid to actuate plunger 14 in the first direction D1 by pulling the plunger toward the linear actuator 18.

Body 12 and the retainer 40, which is in the form of a C-shaped retaining ring in FIGS. 1 and 2, can both for example be rigidly mounted inside of a tubular rotor, and a shaft can run through the middle of actuating assembly 10. A disconnect clutch, when actuated by actuating assembly 10, can alternately couple and de-couple the tubular rotor to and from the shaft. A spring 44, which is shown schematically, can urge the armature 42 gently toward body 12, attempting to create space between a face of the disconnect clutch and the armature 42.

Linear actuator 18 is located on the opposite end of body 12 from the armature 42, and can forcefully pull the armature 42 and plunger 14 toward the body 12 when the coil of linear actuator 18 is electrically energized, in the same direction as the push of the spring 44, which generates a weaker axial force than spring 22.

Spring 22, with one end anchored against the retainer 40, presses against barrel 20, which is axially slidable in the body 12 and is also free to rotate inside the body 12 unless barrel surfaces 20a or 20b are engaged with the tabs 26. Depending upon the axial position of the plunger 14 and the angular orientation of the rotating barrel 20, the force of the spring 22 pushes the rotating barrel 20 into the body 12 until the travel of barrel 20 is stopped by either the plunger 14 or the body 12. The actuating assembly 10 is configured such that, depending on the axial position of the plunger 14 and a rotational orientation of the barrel 20, the barrel 20 is resiliently preloaded for axial movement with respect to the body 12 and the plunger 14 such that depending on an axial position of the plunger 14 and a rotational orientation of the barrel 20, the barrel 20 is forceable into each of:

a first orientation in which the barrel 20 circumferentially engages the plunger 14;

a second orientation in which first barrel surface 20a circumferentially engages the body 12 and the barrel 20 is in a first axial position; and a third orientation in which a second barrel surface 20b circumferentially engages the body 12 and the barrel 20 is in a second axial position different from the first axial position. The barrel 20 is axially closer to the engagement surface 34 of plunger 14 in the second orientation than in the third orientation.

In the first orientation, the force of the spring 22 pushes the rotating barrel 20 into the body 12 until the travel of barrel 20 is stopped by the ramp surfaces 12b at the ends of the tabs 26 contacting the bottom ramp surfaces 20c of slots 32 the rotating barrel 20. In the second orientation, the force of the spring 22 pushes the rotating barrel 20 into the body 12 until the travel of barrel 20 is stopped by the ramp surfaces 12b at the ends of the tabs 26 contacting the surfaces 20a of ramps 30 of the rotating barrel 20. In the third orientation, the force of the spring 22 pushes the rotating barrel 20 into the body 12 until the travel of barrel 20 is stopped by the surfaces 14b on ramps 28 on the face of the plunger 14 contacting surfaces 20a of ramps 30 of the rotating barrel 20.

The function in actuating assembly 10 is initiated when linear actuator 18 is activated by the solenoid coil being energized, and the armature 42 is pulled toward the body 12. The plunger 14 moves with the armature 42, and maintains a constant angular orientation with respect to the body 12 due to the slots 24 of plunger 14 riding on the tabs 26 of body 12.

If the linear actuating assembly 10 is inactive due to for example the solenoid coil not being energized, then the actuating assembly 10 is the first axial position—i.e., an extended stable position in which the clutch disengaged—and the ramp surfaces 12b at the ends of the tabs 26 contact against the bottom ramp surfaces 20c of slots 32 the rotating barrel 20.

In this case, when the linear actuating assembly 10 is active due to for example the solenoid coil being energized, the force of the linear actuating assembly 10 overcomes the force of spring 22 and the ramps 28 on the face of the plunger 14 move into contact with surfaces 20a of ramps 30 of the rotating barrel 20.

Once plunger 14, which is not free to rotate with respect to the body 12, has pushed rotating barrel 20 far enough for the ends of the tabs 26 to be moved out of slots 24, rotating barrel 20 is free to rotate, and will do so due to low-friction contact between barrel ramp surfaces 36a and plunger ramp surfaces 34a. This relative rotation will stop when rotating barrel 20 has rotated far enough for the stop surfaces 20a at the ends of ramps 30 to contact stop surfaces 14b at the ends of ramps 28. This marks the point of maximum required axial travel, and the activation of linear actuator 18, for example by the flow of electricity to the solenoid coil, can be cut off at this point.

After the linear actuator 18 has been deactivated, spring 22 pushes rotating barrel 20 away from the linear actuator 18, moving armature 42 and plunger 14 along with barrel 20, until ramps 30 come into contact with ramps 28 at the ends of the tabs 26. When this contact initially occurs, the stop surfaces 20a are about half of a ramp length away from the edges of tabs 26, so the force of spring 22 pushes rotating barrel 20 down the contacting ramps 28, 30 until the barrel 20 has rotated far enough for stop surfaces 20a to contact the edges of tabs 26. At this point, actuating assembly 10 is now locked into the second axial position—i.e., a retracted stable position in which the clutch engaged and the ramp surfaces 12b at the ends of the tabs 26 contact against the surfaces 20a of ramps 30 of the rotating barrel 20.

When actuating assembly 10 is in this retracted stable position, and the linear actuator 18 is activated, the linear actuator 18 overcomes the force of spring 22, but has to travel less of an axial distance than during the initial activation of the linear actuator 18 described in the preceding paragraphs. In particular, thr amount of axial travel required to free the rotating barrel 20 from the ends of tabs 26 is much less than in the initial activation of the linear actuator 18, because in this arrangement, the ends of tabs 26 have been resting against ramps 30, instead of against the bottoms of slots 24. Further, at the end of this cycle (after the deactivation of the linear actuator 18), the amount of axial travel required to seat the rotating barrel 20 into the extended stable position is much greater than in the initial activation of the linear actuator 18. This is because tabs 26 move into slots 24, and spring 22 then keeps pushing the rotating barrel 20, along with armature 42 and plunger 14, away from the linear actuator 18 until the ramp surfaces 12b at the ends of tabs 26 have seated at the bottoms of slots 24 in the rotating barrel 20.

Instead of using actuating assembly 10 with a clutch, actuating assembly 10 can also be used for control of 2-position hydraulic or pneumatic spool valves. The current state of the art is for these valves to utilize two electrical solenoids, one mounted at each end of the valve housing, each with its own set of wires. Each solenoid will push (or pull) the spool in one direction, opposite to that of the other solenoid.

This system could be replaced with a less expensive arrangement, in which only a spring (instead of a solenoid) is installed at one end of the housing, to push the spool toward a single solenoid mounted at the opposite end of the housing. To shift the spool in the valve, this solenoid, in combination with the present disclosure, would be momentarily energized, to overcome the preload force of the spring, pushing the spool slightly past its farthest stable position, and then be shut off. The spring force would then move the spool back toward the solenoid, and the device of the present disclosure would lock it into one of its two stable, pre-defined axial positions.

Actuating assembly 10 can also be used with a 2-position rotary valve, such as a ball or butterfly valve. The arrangement can be similar to the configuration described above for use with the spool valve. However, in this application, actuating assembly 10 can act upon a bellcrank attached to the valve's pivot rod, the solenoid would be mounted to some sort of bracket on the valve's housing, and a torsion spring could be used to bias the valve toward the solenoid's de-energized position.

Actuating assembly 10 can also be applied to mechanisms utilizing other types of solenoids (not just electrical). For example, vacuum solenoids, in either a push-type or pull-type configuration, of the type commonly used in automotive applications, can also be used in actuating assembly 10.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 actuating assembly
12 body
12a first body surface
12b second body surface/body ramp surface
14 plunger
14a first plunger surface
14b second plunger surface
18 linear actuator
20 barrel
20a first barrel surface
20b second barrel surface
20c second barrel surface/barrel ramp surfaces
22 spring 24 plunger slots
26 body tabs
28 plunger ramps
30 barrel ramps
32 barrel slots
34 barrel engagement surface of plunger
34a ramp surfaces of plunger
36 plunger engaging surface of barrel
36a ramp surfaces of barrel
40 retainer
42 armature
44 spring

What is claimed is:

1. An actuating assembly for an automotive drivetrain comprising:
    a body;
    a plunger axially movable with respect to the body;
    a linear actuator configured for being activated to axially move the plunger in a first direction into engagement with the body such that the plunger and body are rotationally fixed with respect to each other;
    a barrel movable with respect to the body for contacting the plunger and the body depending on an axial position of the plunger; and
    a spring for biasing the barrel toward the plunger, the barrel being configured such that the spring forces the barrel into circumferential engagement with the body in two different axial positions of the barrel with respect to the body when the linear actuator is inactive depending on a rotational orientation of the barrel.

2. The actuating assembly as recited in claim 1 wherein the actuating assembly is configured such that, depending on the axial position of the plunger and the rotational orientation of the barrel, the spring forces the barrel into each of:
    a first orientation in which the barrel circumferentially engages an engagement surface of the plunger;
    a second orientation in which a first surface of the barrel circumferentially engages the body and the barrel is in a first axial position of the two different axial positions; and
    a third orientation in which a second surface of the barrel circumferentially engages the body and the barrel is in a second axial position of the two different axial positions.

3. The actuating assembly as recited in claim 2 wherein the barrel is axially closer to the engagement surface of the plunger in the second orientation than in the third orientation.

4. The actuating assembly as recited in claim 2 wherein the barrel includes barrel ramps and the plunger includes plunger ramps, the barrel ramps axially contacting the plunger ramps in the first orientation.

5. The actuating assembly as recited in claim 4 wherein the body includes tabs having tab ramp surfaces, the tab ramp surfaces axially contacting the barrel ramps in the third orientation.

6. The actuating assembly as recited in claim 5 wherein the barrel includes barrel slots, the tabs being received in the barrel slots in the second orientation.

7. The actuating assembly as recited in claim 6 wherein the barrel slots are formed in some of the barrel ramps.

8. The actuating assembly as recited in claim 5 wherein the plunger includes plunger slots receiving the tabs to rotationally fix the plunger and the body with respect to each other.

9. The actuating assembly as recited in claim 1 wherein the linear actuator is configured for actuating the plunger solely in the first direction.

10. The actuating assembly as recited in claim 1 wherein the barrel is a different circumferential position with respect to the body in each of the two different axial positions.

11. The actuating assembly as recited in claim 1 wherein the two different axial positions are directly rotationally adjacent each other.

12. The actuating assembly as recited in claim 1 wherein the plunger includes a first plunger surface configured for circumferentially engaging a first body surface of the body to rotationally connect the plunger with the body.

13. The actuating assembly as recited in claim 12 wherein the first plunger surface is on at least one slot on of the plunger and the first body surface is on at least one tab of the body, the at least one tab of the body entering into the at least one slot of the plunger to rotationally connect the plunger with the body.

14. The actuating assembly as recited in claim 12 wherein the plunger includes a second plunger surface configured for circumferentially engaging a first barrel surface of the barrel when the linear actuator is activated.

15. The actuating assembly as recited in claim 14 wherein the second plunger surface is on at least one stop edge of a plunger ramp of the plunger and the first barrel surface is on at least one stop edge of a barrel ramp of the barrel.

16. The actuating assembly as recited in claim 14 wherein the barrel includes a second barrel surface configured for circumferentially engaging a second body surface to rotationally connect the barrel with the body in a first of the two different axial positions of the barrel.

17. The actuating assembly as recited in claim 16 wherein the second barrel surface is on at least one slot of the barrel and the second body surface is on axial end of at least one tab of the body, the at least one tab of the body entering into the at least one slot of the barrel to rotationally connect the barrel with the body.

18. The actuating assembly as recited in claim 16 wherein the first barrel surface is configured for circumferentially engaging the first body surface to rotationally connect the barrel with the body in a second of the two different axial positions of the barrel.

19. A method of constructing an actuating assembly for an automotive drivetrain comprising:
    rotationally fixing a plunger to a body such that the plunger is axially movable by a linear actuator with respect to the body in a first direction when the linear actuator is activated; and
    resiliently preloading a barrel for axial movement with respect to the body and the plunger such that depending on an axial position of the plunger and a rotational orientation of the barrel, the barrel is forceable into each of:
    a first orientation in which the barrel circumferentially engages an engagement surface of the plunger;
    a second orientation in which a first surface of the barrel circumferentially engages the body and the barrel is in a first axial position; and
    a third orientation in which a second surface of the barrel circumferentially engages the body and the barrel is in a second axial position axially closer to the engagement surface of the plunger in the second orientation than in the third orientation.

* * * * *